(12) United States Patent
Spitz

(10) Patent No.: US 8,573,881 B2
(45) Date of Patent: Nov. 5, 2013

(54) DEVICE FOR SECURING AN ADD-ON TO A SUPPORT

(75) Inventor: Uwe Spitz, Rheinfelden (DE)

(73) Assignee: A. Raymond et Cie, Grenoble (FR)

( * ) Notice: Subject to any disclaimer, the term of this patent is extended or adjusted under 35 U.S.C. 154(b) by 462 days.

(21) Appl. No.: 12/673,329

(22) PCT Filed: Aug. 7, 2008

(86) PCT No.: PCT/EP2008/006493
§ 371 (c)(1),
(2), (4) Date: Feb. 12, 2010

(87) PCT Pub. No.: WO2009/033531
PCT Pub. Date: Mar. 19, 2009

(65) Prior Publication Data
US 2011/0097137 A1    Apr. 28, 2011

(30) Foreign Application Priority Data

Sep. 6, 2007 (DE) .......................... 10 2007 042 484

(51) Int. Cl.
*F16B 21/08* (2006.01)
(52) U.S. Cl.
USPC ....................... 403/397; 24/295; 403/DIG. 14
(58) Field of Classification Search
USPC ............. 403/326, 329, 397, DIG. 14; 24/295; 411/508
See application file for complete search history.

(56) References Cited

U.S. PATENT DOCUMENTS

| 2,178,719 | A | * | 11/1939 | Cotter | 24/293 |
| 2,188,026 | A | * | 1/1940 | Wiley | 24/293 |
| 2,825,948 | A | * | 3/1958 | Parkin | 411/477 |
| 4,438,552 | A | * | 3/1984 | Omata | 24/704.1 |
| 4,488,206 | A | * | 12/1984 | Mizusawa | 362/549 |
| 4,517,711 | A | * | 5/1985 | Tanaka | 24/453 |
| 4,683,622 | A | * | 8/1987 | Oehlke | 24/458 |
| 4,924,561 | A | * | 5/1990 | Yoneyama | 24/453 |
| 5,036,567 | A | * | 8/1991 | Clinch | 24/453 |
| 5,099,549 | A | * | 3/1992 | Hullmann et al. | 24/295 |
| 5,347,690 | A | * | 9/1994 | Mansoor et al. | 24/295 |
| 5,653,550 | A | * | 8/1997 | Mutz et al. | 403/329 |
| 5,987,714 | A | * | 11/1999 | Smith | 24/295 |
| 6,474,921 | B1 | | 11/2002 | Gordon | |
| 6,745,440 | B2 | * | 6/2004 | Vassiliou | 24/295 |

(Continued)

FOREIGN PATENT DOCUMENTS

| DE | 19607786A1 | A1 | 4/1997 |
| DE | 10208505A1 | A1 | 11/2003 |
| EP | 0476284A1 | A1 | 3/1992 |

OTHER PUBLICATIONS

The International Search Report as published.

*Primary Examiner* — Victor MacArthur
(74) *Attorney, Agent, or Firm* — Faegre Baker Daniels LLP

(57) ABSTRACT

A device for securing an add-on to a support comprises a back wall (3) and a front wall arrangement (14) which is resilient with respect to the back wall (3) and which, when the device is arranged as intended, comes into engagement with an insertion opening provided in an edge region of the support. The device according to the invention comprises a manipulation structure (15, 16, 21) by which, to release the engagement, the front wall arrangement (14) can be moved toward the back wall (3) with the aid of a tool that is introduced through a tool channel (22).

5 Claims, 4 Drawing Sheets

(56) References Cited

U.S. PATENT DOCUMENTS

| | | | |
|---|---|---|---|
| 7,287,945 B2* | 10/2007 | Lubera et al. | 411/508 |
| 7,351,001 B1* | 4/2008 | O'Brien et al. | 403/397 |
| 7,849,567 B2* | 12/2010 | Dickenson et al. | 24/293 |
| 2004/0265094 A1 | 12/2004 | Gordon | |
| 2005/0246871 A1* | 11/2005 | Lubera et al. | 24/295 |
| 2005/0260060 A1* | 11/2005 | Zoubek et al. | 411/508 |
| 2006/0099051 A1* | 5/2006 | Moerke | 411/508 |
| 2006/0254032 A1* | 11/2006 | Gibbons et al. | 24/295 |
| 2006/0288543 A1* | 12/2006 | Lubera et al. | 24/295 |
| 2008/0174151 A1* | 7/2008 | Dickenson et al. | 296/204 |

* cited by examiner

DEVICE FOR SECURING AN ADD-ON TO A SUPPORT

CROSS-REFERENCE TO RELATED APPLICATION

This application is a U.S. National Phase Patent Application based on International Application Serial No. PCT/EP2008/006493 filed Aug. 7, 2008, the disclosure of which is hereby explicitly incorporated by reference herein.

BACKGROUND OF THE INVENTION

1. Field of the Invention

The present invention is directed to a device for securing an add-on to a support.

2. Description of the Related Art

One type of such a device is known from DE 102 08 505 A1. The prior device has a head part provided to rest on the support and comprising laterally protruding bearing portions that rest on the support in the intended arrangement. Also present is a foot part that is provided to be inserted in an insertion opening formed in the support and has a back wall which, in the arrangement where the foot part is inserted in the insertion opening, is disposed opposite the edge of the insertion opening. The foot part is further configured with a front wall which is connected via a bent-back portion to the back wall and extends in angular relation away from the back wall and toward the head part, and which, in the arrangement where the foot part is inserted in the insertion opening, engages, by its free end proximate the head part, behind the edge region of the support that rims the insertion opening.

SUMMARY OF THE INVENTION

The present invention provides a device for securing an add-on to a support, which, while providing secure retention in an insertion opening provided in a support, can be removed again with relative ease.

By virtue of the fact that the inventive device comprises a tool channel which, for example, allows access to the front wall by means of a tool, and the fact that configured on the front wall is a manipulation structure which, in cooperation with a tool, allows the front wall to be moved toward the back wall and thus the rear engagement to be released, the device according to the invention can be detached from the support without compromising the solidity of the original connection.

In one form thereof, the present invention provides a device for securing an add-on to a support, including a head part provided to rest on the add-on or on the support and having laterally protruding bearing portions; and including a foot part which is provided for insertion in an insertion opening formed in the support and has a back wall that is disposed opposite the edge of the insertion opening in the arrangement where the foot part is inserted in the insertion opening, and which is configured with a front wall arrangement that is connected via a bent-back portion to the back wall and is resilient with respect to the back wall and extends away from the back wall toward the head part and, in the arrangement where the foot part is inserted in the insertion opening, engages by its free end proximate the head part in an edge region of the support that rims the insertion opening on the side facing away from the head part (1), characterized in that the head part includes a tool channel in prolongation of the front wall arrangement and in that configured on the front wall arrangement is a manipulation structure that comes into engagement with a tool which is passed through the tool channel to move the front wall arrangement toward the back wall in order to release the rear engagement of the front wall arrangement with the edge regions of the support that border upon the insertion opening.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
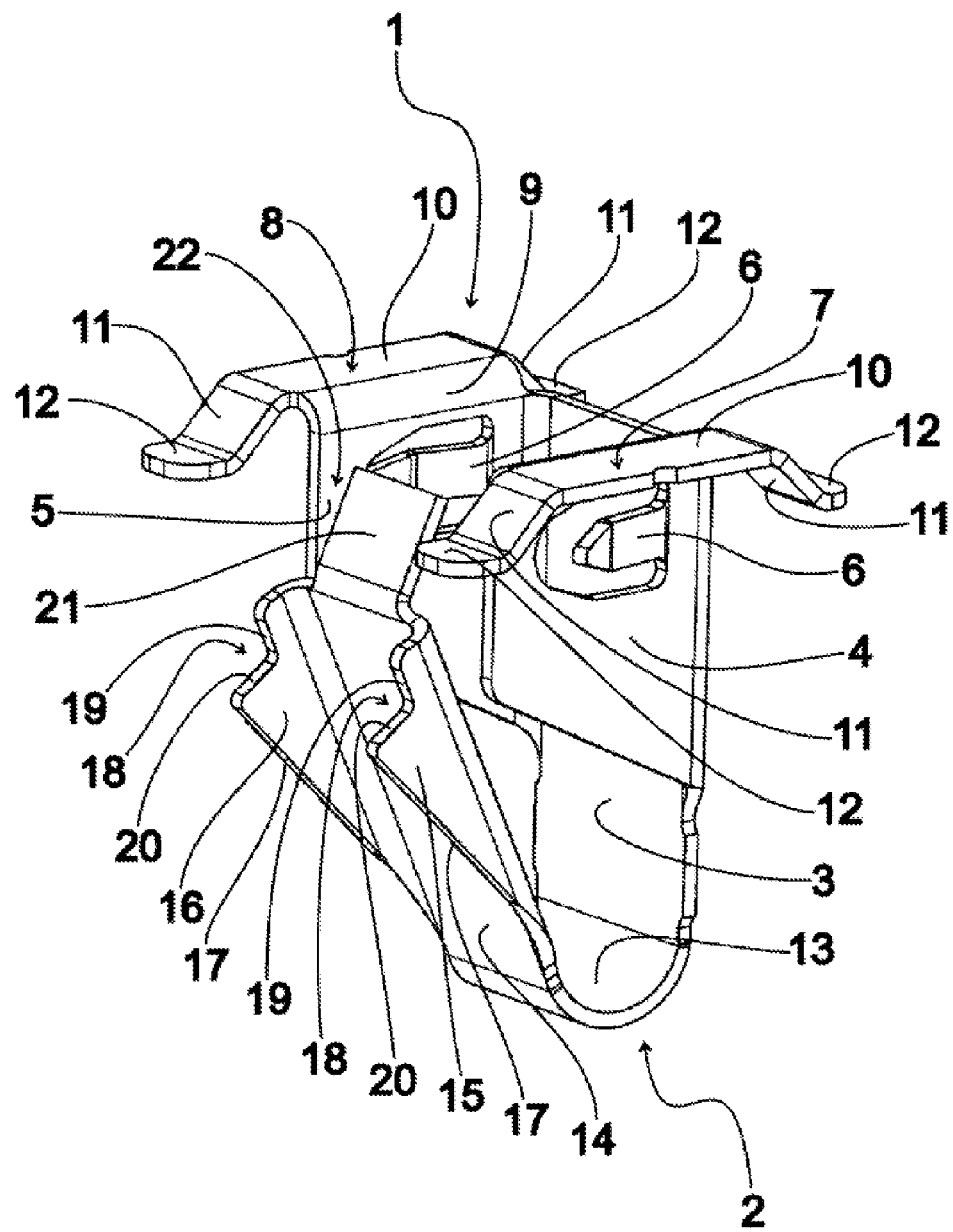
FIG. 1 is a perspective view of an exemplary embodiment of a device according to the invention, configured with a manipulation structure.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a device according to the invention, fabricated from sheet-metal strips by a stamping and bending process. The exemplary embodiment according to FIG. 1 comprises a head part 1 and a foot part 2 that is disposed oppositely from the head part 1.

The foot part 2 has a rectangular, flat back wall 3 with a respective side wing 4, 5 formed onto each of its long sides, in the end region of that side proximate the head part 1. Each side wing 4, 5 juts out approximately perpendicularly to the back wall 3, in the same direction in each case, and has in its region proximate the head part 1 a fixing tongue 6 that extends, angled outward, away from the back wall 3.

Formed onto the side wings 4, 5, flush with the short edge side of back wall 3 that adjoins head part 1, are edge webs 7, 8, each of which is connected to a respective side wing 4, 5 via a bent joining portion 9 that extends outward away from said respective side wing 4, 5. Each edge web 7, 8 is provided with a planar deck portion 10 which is connected to the respective joining portion 9 and extends over the length of the respective side wing 4, 5, and each of which has, formed onto its outer end via an oblique portion 11 inclined toward foot part 2, an approximately square bearing portion 12. The bearing portions 12 lie in a plane that is disposed between the fixing tongues 6 and the edge sides of the side wings 4, 5 that are proximate the head part 1. This lends a certain elasticity in the longitudinal direction of the inventive device.

On the short edge side of back wall 3 that is remote from head part 1, foot part 2 comprises a roundly bent-back portion 13 that extends away from this short edge side of back wall 3 toward head part 1 on the side of back wall 3 on which the side wings 4, 5 are disposed.

Joined to bent-back portion 13, at the end having a short edge side and located remote from back wall 3, is a rectangularly configured front wall 14, as part of a front wall arrangement, which extends from bent-back portion 13 at an oblique angle to back wall 3 and directed away therefrom and toward head part 1. In this exemplary embodiment, joined to the long edge sides of front wall 14, as functional parts of a manipulation structure and as physical elements of the front wall arrangement, are stop wings 15, 16, which are oriented approximately perpendicularly to front wall 14 and extend outward away from back wall 3.

Each stop wing 15, 16 is configured with a respective ramp 17, which slopes upward away from bent-back portion 13, and with a respective latching step 18, formed on the side proximate to head part 1. Each latching step 18 has a contact side 19, which is aligned approximately parallel to front wall 14 and spacedly therefrom, and a rear engagement side 20, which is oriented approximately perpendicular to front wall 14 and which at its end remote from front wall 14 unites with the ramp 17.

In addition, joined to the opposite short edge side of front wall 14 from bent-back portion 13, as another part of the manipulation structure, is a rectangular guide tongue 21, which is set at an oblique angle to front wall 14 and extends toward back wall 3. The free end of guide tongue 21, i.e., the end remote from front wall 14, terminates approximately in the plane of those edge sides of back wall 3 and of side wings 4, 5 which are remote from bent-back portion 13.

It can be seen from FIG. 1 that the parts of the manipulation structure, i.e., in the exemplary embodiment according to FIG. 1, stop wings 15, 16 and guide tongue 21, lie in a tool channel 22 that is disposed between those bearing portions 12 of edge webs 7, 8 which are adjacent the front wall 14.

Figure 2:
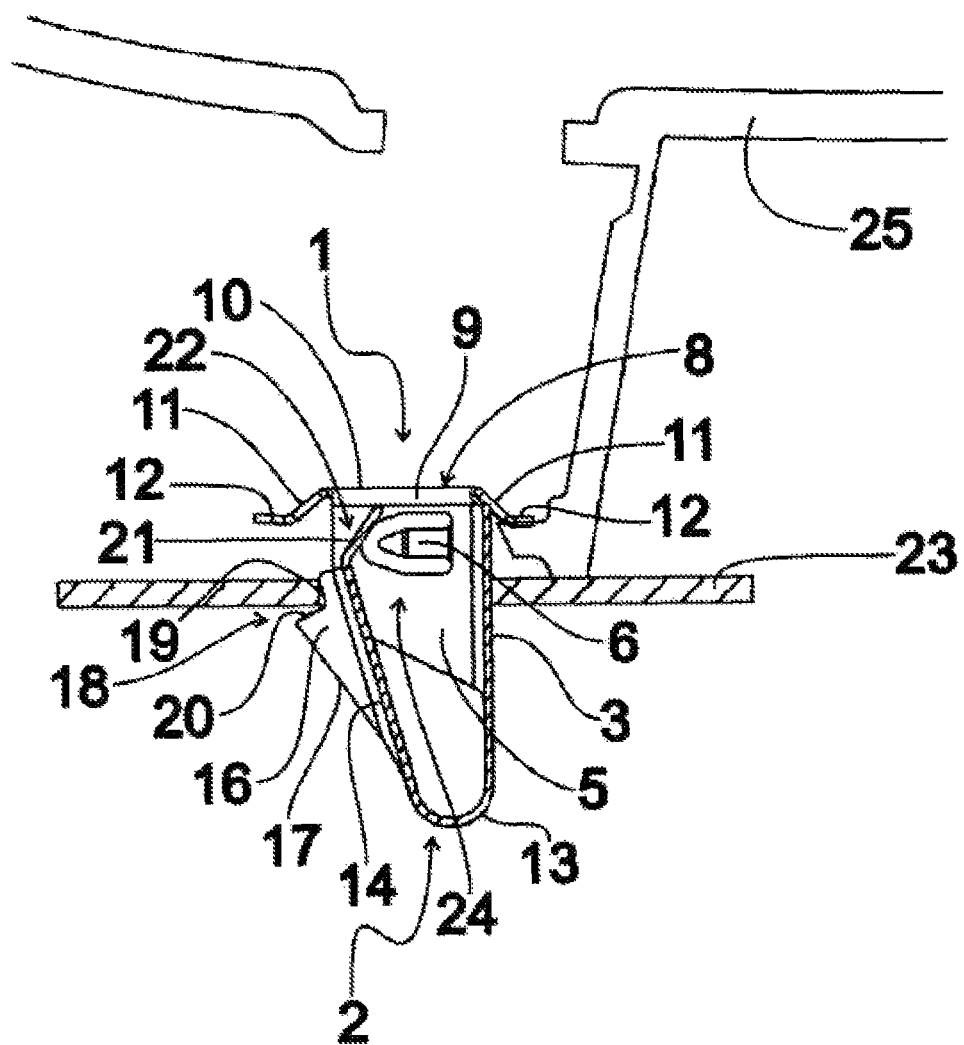
FIG. 2 shows in section the exemplary embodiment according to FIG. 1 in an installed situation.

FIG. 2 shows the exemplary embodiment according to FIG. 1 in longitudinal section in an intended arrangement in which foot part 2 has been inserted in an insertion opening 24, provided in a support 23, the ramp 17 being slid against the edge of the insertion opening 24 and the front wall 14 being deflected toward the back wall 3 during the insertion process, while the bearing portions 12 rest on an add-on 25, which is to be connected to the support 23 and here takes the form of a so-called "retainer" for securing an airbag apparatus, and thereby connect the add-on 25 to the support 23.

In this arrangement, front wall 14 is bent toward back wall 3 compared to the relaxed arrangement depicted in FIG. 1, it being the case that due to the restoring force exerted by bent-back portion 13, the contact sides 19 of the stop wings 15, 16 are in contact with the edge of insertion opening 24, while the rear engagement sides 20 of the stop wings 15, 16 engage behind the edge region of support 23 that borders insertion opening 24 on the side facing away from add-on 25, and back wall 3 is in contact with the edge of insertion opening 24. The device according to the invention is thereby anchored in the insertion opening 24 with a very high pull-out force, such that the add-on 25 is very stably connected to the support 23.

Figure 3:
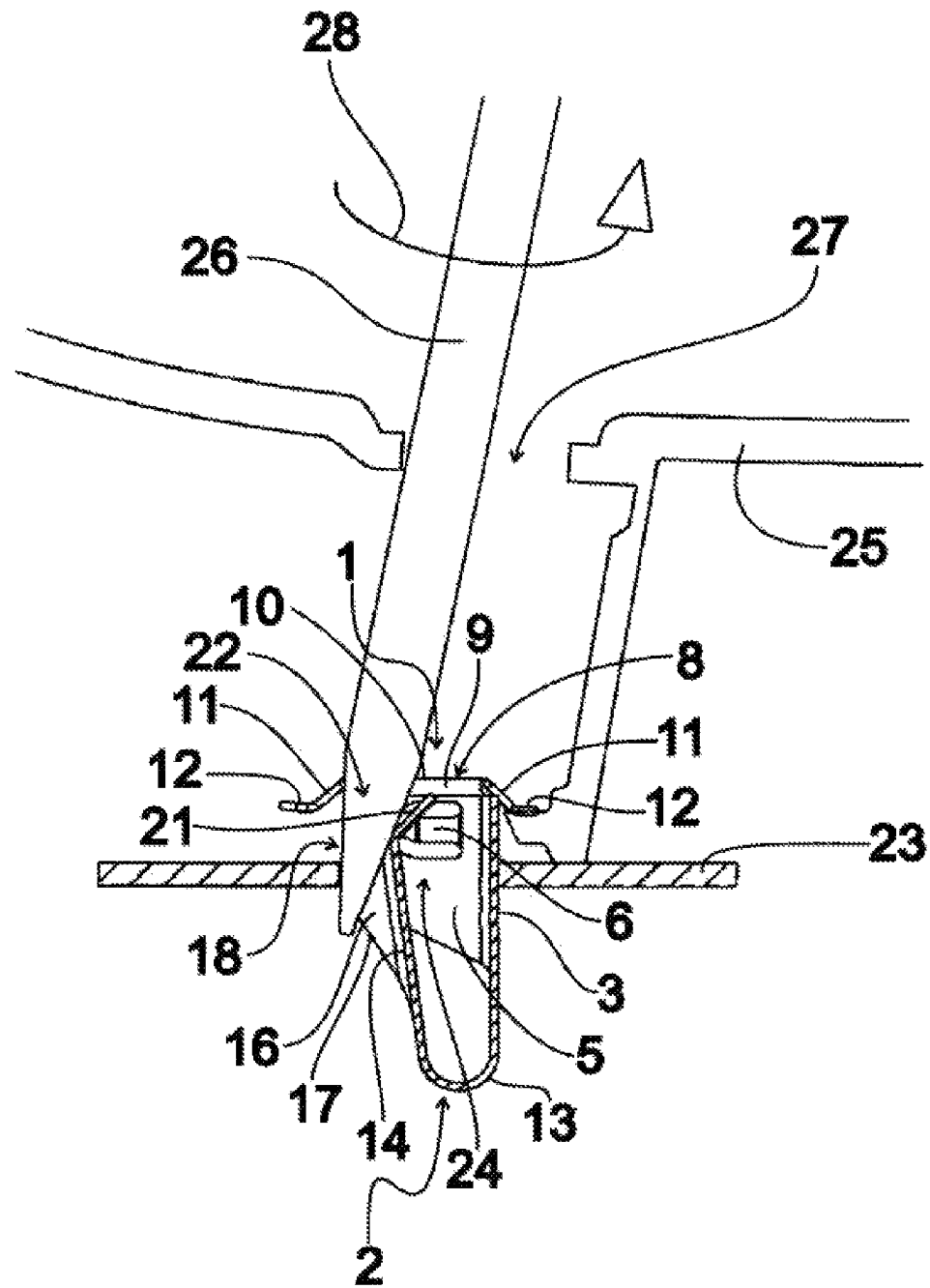
FIG. 3 shows in section the arrangement of the exemplary embodiment of the invention according to FIG. 2 with a tool engaged with the manipulation structure.

FIG. 3 shows, in a sectional view corresponding to the representation of FIG. 2, the arrangement according to FIG. 2 with a partially illustrated screwdriver whose screwdriver blade 26, as a tool for releasing the connection between the inventive device and the support 23, has been inserted all the way through a pass-through opening 27 in the add-on 25 and on into the tool channel 22. During this operation, the screwdriver blade 26 is guided by the obliquely positioned guide tongue 21 toward the side of front wall 14 that faces away from back wall 3, passing between the stop wings 15, 16 and between front wall 14 and the edge of the insertion opening 24. In this arrangement, front wall 14 is bent toward back wall 3 compared to the arrangement of FIG. 2, although under some circumstances the rear engagement of rear engagement sides 20 with the edge region of support 23 adjacent the insertion opening 24 may not be cancelled yet, it still being necessary to turn the screwdriver blade 26 in a direction of rotation 28 indicated by an arrow to achieve this purpose.

Figure 4:
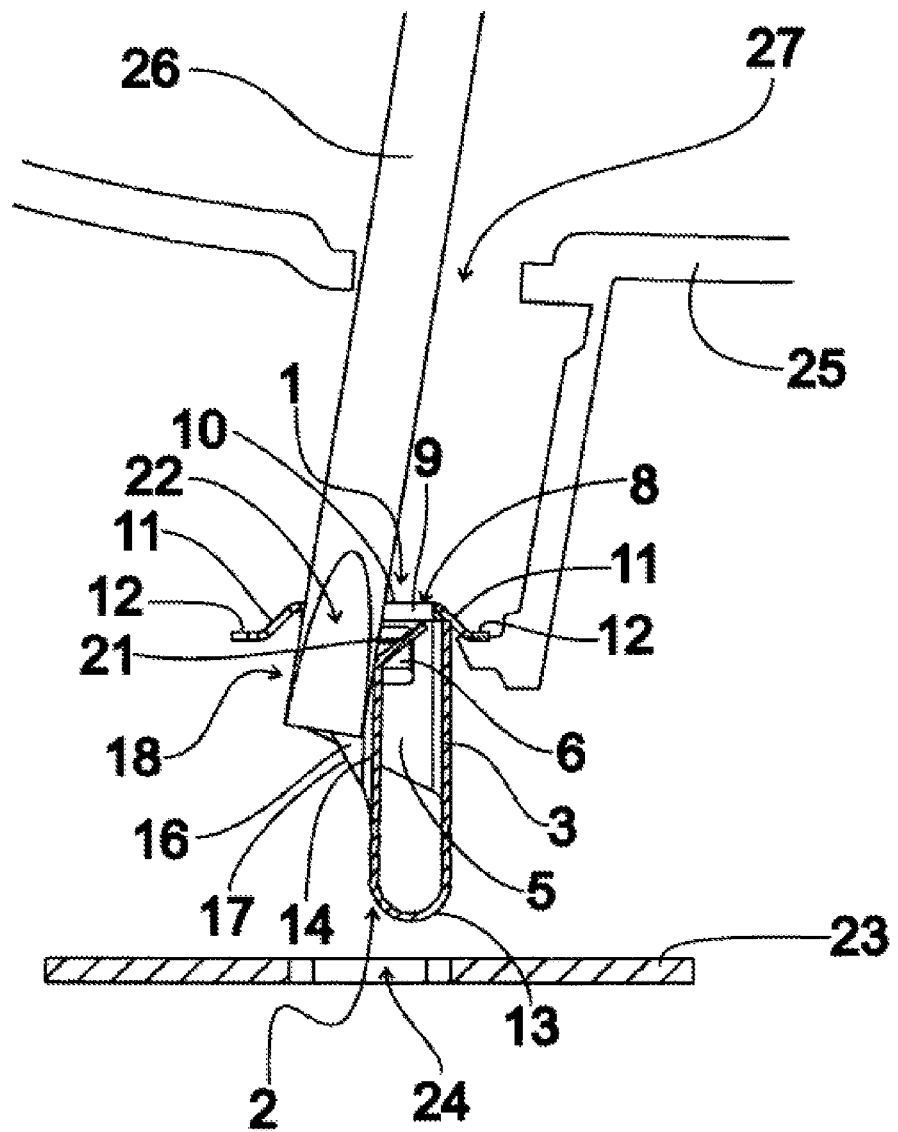
FIG. 4 shows in section the exemplary embodiment according to FIG. 1 after being removed from the arrangement according to FIG. 2 and FIG. 3.

FIG. 4 is a representation according to FIGS. 2 and 3 of the exemplary embodiment of FIG. 1 after the screwdriver blade 26 has been turned in direction of rotation 28 to arrive at an orientation that is approximately perpendicular to the arrangement of FIG. 3, and in which, due to the width of the screwdriver blade 26, front wall 14 is, in the region of tool channel 22, shifted still farther in the direction of back wall 3 compared to the arrangement of FIG. 3, and the rear engagement of rear engagement sides 20 with the edge region of support 23 that borders upon insertion opening 24 is released completely. In this arrangement, the device according to the invention can now be removed without hindrance from the insertion opening 24, and the add-on 25 can thus be removed from the support 23. Meanwhile, the fixing tongues 6 secure the inventive device against accidentally dropping out of the add-on 25.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for use in securing an add-on part to a support having an insertion opening with an edge, the device removable with the use of a tool, said device comprising:
   a head part adapted to rest on one of the add-on part and the support, said head part including laterally protruding bearing portions;
   a foot part insertable into the insertion opening and including a back wall, said back wall disposed opposite the edge of the insertion opening when said foot part is inserted in the insertion opening;
   a front wall arrangement resiliently connected to said back wall via a bent-back portion and extending away from said back wall toward said head part, said front wall arrangement further including a tool channel and a free end proximate said head part engageable with the edge of the insertion opening on the side of the insertion opening opposite said head part when said foot part is inserted in the insertion opening, the front wall arrangement further including manipulation structure engageable by the tool when the tool is passed through said tool channel to move said front wall arrangement toward said back wall to release said front wall arrangement from the edge of the insertion opening; and
   said manipulation structure further comprising:
   a pair of stop wings formed laterally on said front wall and extending outwardly in a first direction away from said back wall, said stop wings parallel to one another and defining said tool channel therebetween, each said stop wing including a latching step having a contact side and a rear engagement side disposed substantially at a right angle with respect to one another, said contact sides disposed parallel with said front wall and spaced outwardly from said front wall wherein, when said foot part is inserted in the insertion opening, said contact sides are engageable with the edge of the insertion opening with said tool channel defined between said contact sides of said stop wings, and said rear engagement sides are engagable with an edge region of said support that faces away from said head part; and a guide tongue joined to said free end of, and set at an oblique angle to, said front wall arrangement and extending in a second direction away from said stop wings into the region of said head part and toward said head part at an angle with respect to said back.

2. The device of claim 1, wherein said head part includes two laterally outwardly protruding, elongated edge webs.

3. The device of claim 2, wherein said edge webs each include a pair of ends, and oblique portions joined to each said end, said oblique portions bent toward said foot part, said bearing portions formed on said oblique portions.

4. The device of claim 2, wherein each said edge web is joined to a respective side wing formed on a respective edge side of said back wall.

5. The device of claim 4, wherein each side wing includes a respective laterally outwardly protruding fixing tongue.

* * * * *